United States Patent
Nolan

[11] Patent Number: 6,100,494
[45] Date of Patent: Aug. 8, 2000

[54] INSERT FOR AN ABRASIVE TOOL

[76] Inventor: Donal Anthony Nolan, Killulacross, Newmarket on Fergus, County Clare, Ireland

[21] Appl. No.: 09/014,180

[22] Filed: Jan. 27, 1998

[30] Foreign Application Priority Data

Jan. 28, 1997 [GB] United Kingdom .................. 9701695

[51] Int. Cl.⁷ .............................. B21K 5/04; B23H 1/00
[52] U.S. Cl. ..................... 219/69.17; 76/108.1; 76/108.2
[58] Field of Search .......................... 219/69.17, 121.67, 219/121.72; 51/295, 307, 309; 76/108.1, 108.2

[56] References Cited

U.S. PATENT DOCUMENTS

| | | | |
|---|---|---|---|
| 4,481,016 | 11/1984 | Campbell | 51/295 |
| 4,525,179 | 6/1985 | Gigl | 51/309 |
| 4,694,710 | 9/1987 | Phaal | 76/108.1 |
| 4,724,728 | 2/1988 | Phaal | 76/108.1 |
| 5,544,550 | 8/1996 | Smith | 76/108.2 |
| 5,598,750 | 2/1997 | Griffin et al. | 76/108.2 |
| 5,669,271 | 9/1997 | Griffin et al. | 76/108.2 |
| 6,011,232 | 1/2000 | Matthias | 219/69.17 |

FOREIGN PATENT DOCUMENTS

| | | |
|---|---|---|
| 0 009 315 | 4/1980 | European Pat. Off. . |
| 0 009 315 A1 | 4/1980 | European Pat. Off. . |
| 0 206 652 | 12/1986 | European Pat. Off. . |
| 0 223 474 | 5/1987 | European Pat. Off. . |
| 0 223 474 A3 | 5/1987 | European Pat. Off. . |
| 0 278 703 A2 | 8/1988 | European Pat. Off. . |
| 0 278 703 A3 | 8/1988 | European Pat. Off. . |
| 0 312 281 A2 | 4/1989 | European Pat. Off. . |
| 0 312 281 A3 | 4/1989 | European Pat. Off. . |
| 0 322 214 A1 | 6/1989 | European Pat. Off. . |
| 0 546 725 A1 | 6/1993 | European Pat. Off. . |

*Primary Examiner*—Geoffrey S. Evans
*Attorney, Agent, or Firm*—Oblon, Spivak, McClelland, Maier & Neustadt, P.C.

[57] ABSTRACT

A method is provided for producing two or more inserts for an abrasive tool. Each insert includes an abrasive compact layer bonded to a support layer along an interface which has a discontinuity in the form of at least one recess extending into one of the layers. The method includes the steps of providing a composite abrasive compact having an abrasive compact layer bonded to a support layer along an interface which has a discontinuity in the form of at least one recess extending into one of the layers and severing the composite abrasive compact along planes transverse to the interface through or around the recess or recesses to produce two or more of the inserts.

14 Claims, 3 Drawing Sheets

INSERT FOR AN ABRASIVE TOOL

BACKGROUND OF THE INVENTION

1. Field of the Invention

This invention relates to an insert for an abrasive tool such as a drill.

2. Discussion of the Background

Composite abrasive compacts are products used extensively as inserts for abrasive tools such as drills. Such composite compacts comprise an abrasive compact layer bonded to a cemented carbide support. The abrasive compact will typically be a diamond abrasive compact, also known as polycrystalline diamond or PCD, or a cubic boron nitride compact, also known as polycrystalline CBN or PCBN.

The inserts are generally brazed into, or mounted in, a drill bit or similar tool and in so doing stresses may be introduced into the interface between the abrasive compact layer and the cemented carbide support. These stresses may be alleviated or reduced by providing a recess which extends into the cemented carbide support from the compact/carbide interface and which is filled with the abrasive compact.

Composite abrasive compacts are made under conditions of temperature and pressure at which the abrasive particle is crystallographically stable. They are generally produced in capsules, the outer dimensions of which are generally the same, or essentially the same, as the composite compact itself. Thus, a limited number only of such composite compacts may be produced in any one synthesis cycle.

EP 0 009 315 describes a method of making inserts suitable for tools or drill bits which includes the step of fragmenting a circular cylindrical or disc-shaped abrasive compact into a plurality of discrete, non-segmental fragments, the severing taking place along planes at an angle to the circular end-surfaces of the compact.

EP 0 223 474 describes a method of making a drill blank comprising a cylindrical carbide body having a vein of abrasive compact embedded in a groove at one end thereof, and bonded to the carbide. The method includes the steps of providing a solid, cylindrical body of cemented carbide having the end surfaces joined by a side surface, forming a series of grooves in one end surface, placing compact-forming material in the grooves, exposing the cylindrical body to temperature and pressure conditions suitable to produce an abrasive compact of the material in the grooves and severing the cylindrical body longitudinally from one end surface to the opposite end surface to produce a plurality of drill blanks.

EP 0 206 652 also describes a method of producing a plurality of drill blanks by severing a disc-shaped composite abrasive compact longitudinally.

SUMMARY OF THE INVENTION

According to the present invention, a method of making two or more inserts for an abrasive tool is provided, each insert comprising an abrasive compact layer bonded to a support layer along an interface which has a discontinuity in the form of at least one recess extending into one of the layers, and which includes the steps of providing a composite abrasive compact comprising an abrasive compact layer bonded to a support layer along an interface which has a discontinuity in the form of at least one recess extending into one of the layers and severing the composite abrasive compact along planes transverse to the interface and through or around the recess or recesses to produce two or more of the inserts.

Preferably the composite abrasive compact is a relatively large one and a plurality of inserts, e.g. at least five inserts, are produced.

The composite abrasive compact will typically be disc-shaped and the inserts which are produced will be of similar shape. The inserts may be produced along severed planes which are discrete from each other leaving a honeycomb-like residue once all the inserts have been produced.

Essential to the invention is that severing takes place through or around the recesses in the interface of the composite abrasive compact. Preferably, the severing takes place through the recess or recesses. Thus, the inserts which are produced will themselves each have an interface with a discontinuity in the form of a recess extending from the interface into either the support layer or the compact layer.

The discontinuity in the interface of the composite abrasive compact may take any one of several forms. For example, the discontinuity may take the form of a plurality of spaced strip-shaped recesses. In this case, severing of the composite abrasive compact will generally take place such that each insert contains one such recess in its interface. That recess may be wholly contained within the periphery of the insert, or may extend from one side of the insert to an opposite side. The discontinuity may also take the form of a plurality of parallel strip-shaped recesses, or a plurality of concentric ring-shaped recesses. Further, the discontinuity may take the form of a plurality of intersecting strip-shaped recesses. In this case, it is preferable that severing takes place such that the recess of each insert includes an intersection of the strip-shaped recesses from the composite abrasive compact.

The recess or recesses may extend from the interface either into the support layer or into the compact layer.

The severing may take place by methods known in the art such as laser cutting, EDM cutting and the like.

The compact layer will typically be a diamond compact layer or a cubic boron nitride compact layer.

The support layer will generally be a cemented carbide support layer. The cemented carbide may be any known in the art and is preferably cemented tungsten carbide.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Embodiments of the invention will now be described with reference to the accompanying drawings.

Figure 1:
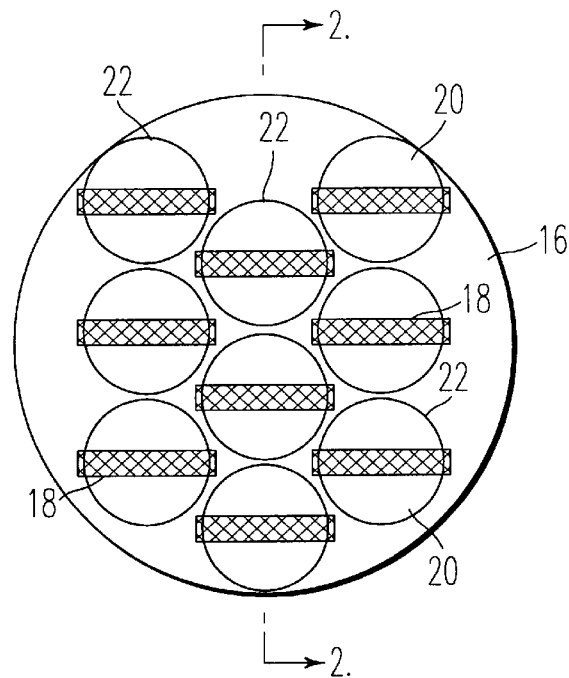
FIG. 1 is a plan view of a composite abrasive compact from which a plurality of inserts for an abrasive tool may be produced by the method of the invention.
Figure 2:
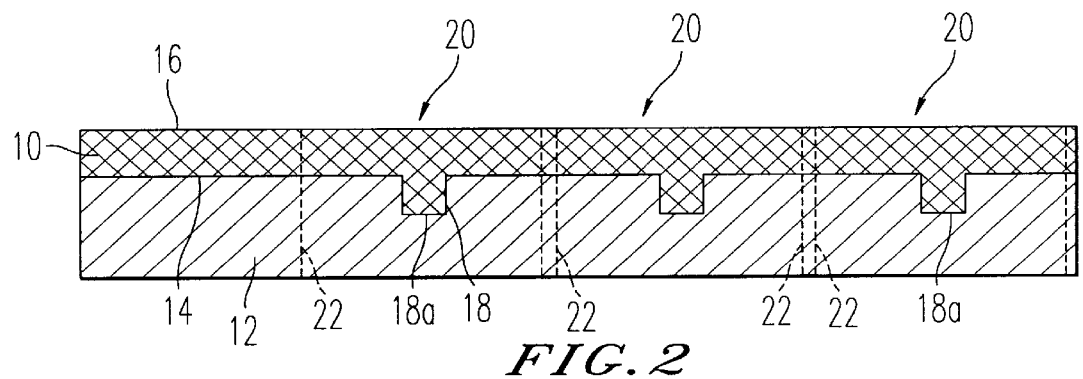
FIG. 2 is a section along the line 2—2 of FIG. 1.

Referring first to FIGS. 1 and 2, a composite abrasive compact comprises an abrasive compact layer 10 bonded to a cemented carbide support 12 along an interface 14. The top surface 16 of the abrasive compact layer 10 is flat. The composite abrasive compact is circular in plan, i.e. disc-shaped.

The interface 14 has a discontinuity in the form of a plurality of recesses 18 which extend into the carbide support 12 from the interface 14. These recesses are filled with abrasive compact which is bonded to the cemented carbide. Each recess is of a rectangular, strip form, as can be seen from FIG. 1, and has a constant cross-section. The recesses are illustrated by the hatched areas in FIG. 1. The bases 18a of the recesses are flat, but these bases can take other shapes, e.g. curved.

The composite abrasive compact is of large diameter, e.g. 13 to 150 mm, and a plurality of inserts 20 may be cut from the composite abrasive compact. Each insert 20 is disc-shaped and comprises a layer of abrasive compact 10 bonded to a cemented carbide support 12 along an interface 14. Each insert 20 also has a discontinuity in the interface 14 in the form of a recess 18 extending into the carbide support 12. The recess 18 is filled with abrasive compact which is bonded to the cemented carbide. In order to achieve this, the composite abrasive compact is severed along circular planes 22, as illustrated by FIGS. 1 and 2. Severing takes place through the recesses 18 to ensure that the interface 14 of each insert 20 is provided with a recess 18 extending into the carbide support.

The severing or cutting takes place such that the rectangular, strip-like recesses 18 are centrally located across the inserts 20 and extend from one side of the inserts to an opposite side. The severing or cutting is similar to cutting a plurality of biscuits from a layer of dough and leaves behind a honeycomb-type residue.

The invention thus allows for a large number of inserts to be produced from a single large diameter composite abrasive compact.

Figure 3:
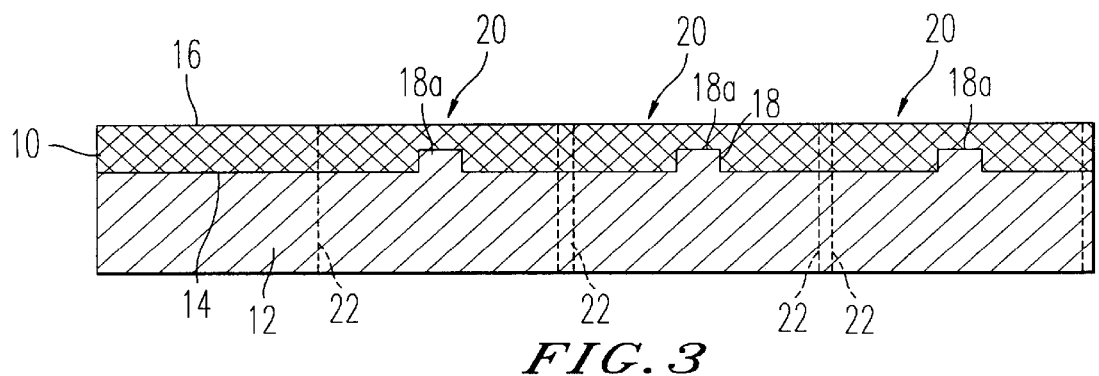
FIG. 3 is a sectional side view of a further embodiment of a composite abrasive compact useful in the practice of the invention.

In the embodiment of FIGS. 1 and 2, the recesses 18 extend from the interface 14 into the cemented carbide support layer 12. In an alternative embodiment, the recesses 18, may extend from the interface 14 into the compact layer 10. This embodiment is illustrated by FIG. 3 where like parts to those of the FIG. 1/2 embodiment carry like numerals. It will be noted that in this embodiment the recesses 18 are filled not by abrasive compact, but by cemented carbide. The cemented carbide is bonded to the abrasive compact.

Figure 4:
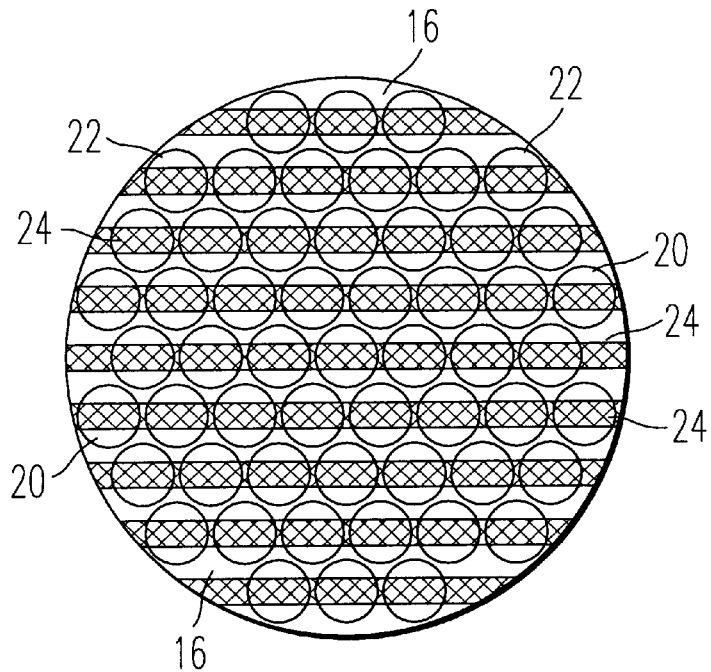
FIGS. 4, 5, 6, to 7 are plan views of further embodiments of composite abrasive compacts useful in the practice of the invention.
Figure 5:
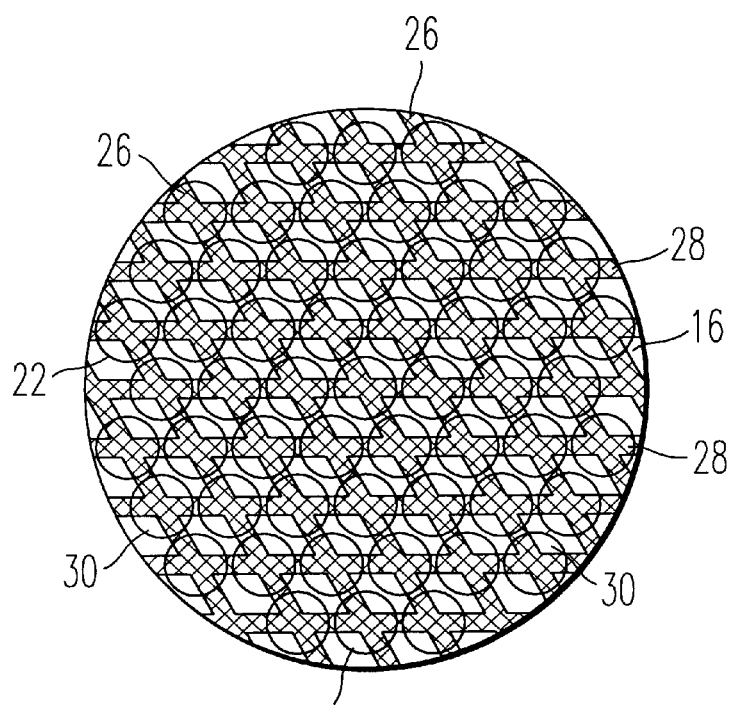
Figure 6:
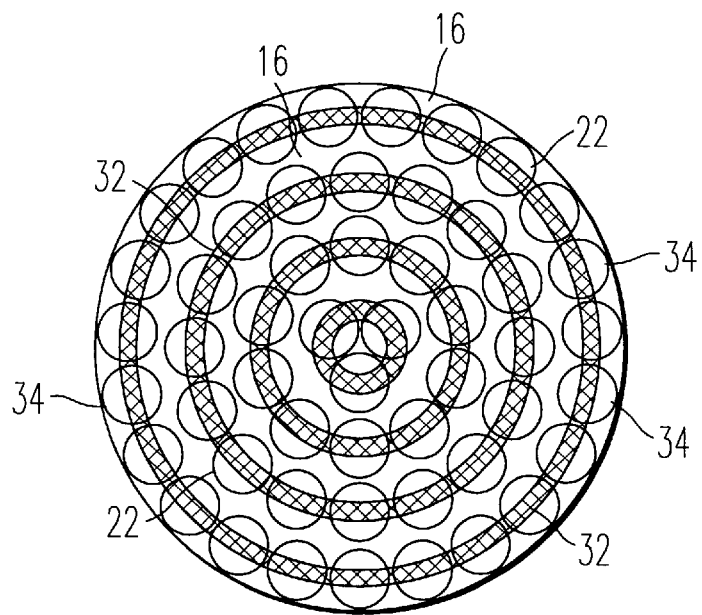
Figure 7:
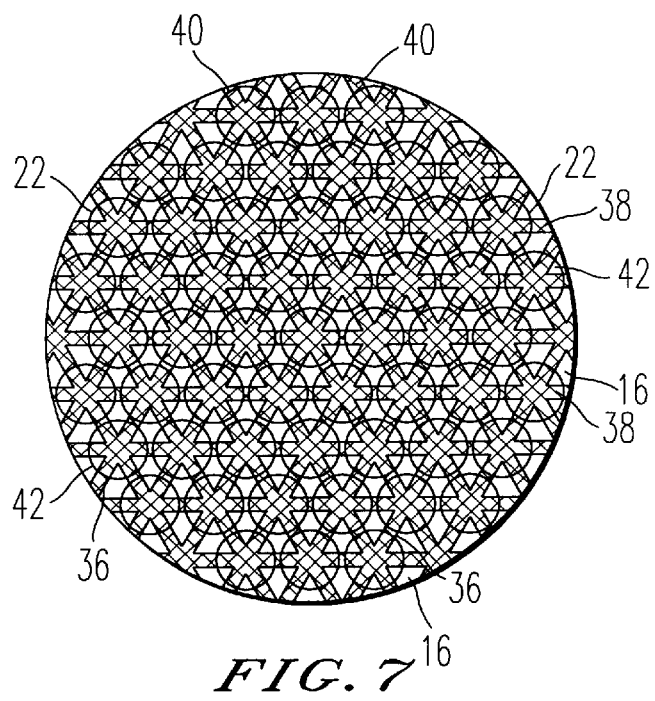

FIGS. 4 to 6 illustrate further embodiments of composite abrasive compacts useful in the practice of the invention and like parts to those of the FIG. 1/2 embodiment again carry like numerals.

FIG. 4 differs from FIG. 1 in that a plurality of parallel strip-shaped recesses 24 are provided which extend from one side of the composite abrasive compact to the other. Severing of the composite abrasive compact takes place along circular planes 22, as illustrated, and a large number of inserts 20 may be produced. For each insert, the recesses extending into the support layer from the interface will be centrally located and extend from one side of the insert to an opposite side.

In the embodiment of FIG. 5, a first set of parallel strip-shaped recesses 26 intersect a second series of parallel strip-shaped recesses 28. The inserts 30 produced from this composite abrasive compact each have a cross-shaped recess provided at the compact/support layer interface.

In the FIG. 6 embodiment, the discontinuity in the interface takes the form of a plurality of concentric ring-shaped recesses 32. As in the other embodiments, severing takes place along circular planes 22, producing a large number of inserts 34. Each insert 34 has a curved recess extending from one side of an insert to an opposite side.

The embodiment of FIG. 6 is similar to that of FIG. 5, save that an additional set of parallel strip-shaped recesses is provided. Thus, three sets 36, 38 and 40 of parallel, intersecting recesses are provided. Severing along circular planes 22 produces a large number of inserts 42 each with a recess which is star-like in shape.

Obviously, numerous modifications and variations of the present invention are possible in light of the above teachings. It is therefore to be understood that within the scope of the appended claims, the invention may be practiced otherwise than as specifically described herein.

I claim:

1. A method of producing two or more inserts for an abrasive tool, each insert comprising an abrasive compact layer bonded to a support layer along an interface which has a discontinuity in the form of at least one recess extending into one of the layers, which comprises:

provide a composite abrasive compact comprising an abrasive compact layer bonded to a support layer along an interface which has a discontinuity in the form of at least one recess extending into one of the layers; and severing the composite abrasive compact along planes transverse to the interface and through or around the recess or recesses to produce two or more of the inserts.

2. A method according to claim 1, which comprises producing five or more inserts.

3. A method according to claim 1 wherein the composite abrasive compact is disc-shaped and the inserts which are produced are disc-shaped.

4. A method according to claim 1 wherein the recess in each insert has at least a portion which extends from one side of the insert to an opposite side.

5. A method according to claim 1 wherein the discontinuity in the interface of the composite abrasive compact has the form of a plurality of spaced strip-shaped recesses, and the severing takes place such that each insert contains one such recess in its interface.

6. A method according to claim 1 wherein the discontinuity in the interface of the composite abrasive compact has the form of a plurality of parallel strip-like shaped recesses.

7. A method according to claim 1 wherein the discontinuity in the interface of the composite abrasive compact has the form of a plurality of concentric ring-shaped recesses.

8. A method according to claim 1 wherein the discontinuity in the interface of the composite abrasive compact has the form of a plurality of intersecting strip-shaped recesses.

9. A method according to claim 8 wherein severing takes place such that the recess of each insert includes an intersection of the strip-shaped recesses.

10. A method according to claim 1 wherein the recess or recesses extend from the interface into the support layer.

11. A method according to claim 1 wherein the recess or recesses extend from the interface into the compact layer.

12. A method according to claim 1 wherein severing takes place by a method selected from laser cutting and electric discharge machining.

13. A method according to claim 1 wherein the compact layer is selected from the group consisting of a diamond compact layer and a cubic boron nitride layer.

14. A method according to claim 1 wherein the support layer comprises a cemented carbide support layer.

* * * * *